United States Patent
Blank et al.

(10) Patent No.: US 9,698,437 B2
(45) Date of Patent: Jul. 4, 2017

(54) METHOD FOR OPERATING A FUEL CELL STACK FOR A FUEL CELL SYSTEM, AND FUEL CELL SYSTEM

(71) Applicants: Felix Blank, Constance (DE); Martin Woehr, Weilheim (DE)

(72) Inventors: Felix Blank, Constance (DE); Martin Woehr, Weilheim (DE)

(73) Assignee: Daimler AG, Stuttgart (DE)

(*) Notice: Subject to any disclaimer, the term of this patent is extended or adjusted under 35 U.S.C. 154(b) by 242 days.

(21) Appl. No.: 14/386,870

(22) PCT Filed: Feb. 21, 2013

(86) PCT No.: PCT/EP2013/000499
§ 371 (c)(1),
(2) Date: Sep. 22, 2014

(87) PCT Pub. No.: WO2013/139424
PCT Pub. Date: Sep. 26, 2013

(65) Prior Publication Data
US 2015/0044590 A1    Feb. 12, 2015

(30) Foreign Application Priority Data
Mar. 23, 2012  (DE) .............. 10 2012 005 837

(51) Int. Cl.
*H01M 8/04* (2016.01)
*H01M 8/04746* (2016.01)
(Continued)

(52) U.S. Cl.
CPC ... *H01M 8/04768* (2013.01); *H01M 8/04014* (2013.01); *H01M 8/04029* (2013.01);
(Continued)

(58) Field of Classification Search
CPC ......... H01M 8/04768; H01M 8/04029; H01M 8/04253; H01M 8/04014; H01M 8/04358
See application file for complete search history.

(56) References Cited

U.S. PATENT DOCUMENTS 4,582,765 A * 4/1986 Kothmann ........ H01M 8/04014
                                                        165/97
6,087,028 A    7/2000 Goto
(Continued)

FOREIGN PATENT DOCUMENTS

DE    102007034300 A1    2/2008
DE    102007017172 A1    10/2008
(Continued)

OTHER PUBLICATIONS

English language translation of Japanese Office Action dated May 18, 2016, in Japanese Application No. 2015-500786.
(Continued)

*Primary Examiner* — Karie O'Neill Apicella
(74) *Attorney, Agent, or Firm* — Patent Central LLC; Stephan A. Pendorf

(57) ABSTRACT

A method for operating a fuel cell stack (10) for a fuel cell system, in particular of a vehicle, in which by reversing the flow direction (14, 16) of a coolant during a cooling operation, the coolant in the fuel cell stack (10) is initially conveyed in a first direction (14). The coolant is subsequently conveyed in a second direction (16) which is at least substantially opposite to the first direction (14). A time period, after the elapse of which the flow direction (14, 16) is reversed, is changed during the cooling operation. In addition, a distance at which a coolant volume is situated from a heat source (12) that is present in the fuel cell stack (10) may be changed during the cooling operation. The invention further relates to a fuel cell system.

13 Claims, 2 Drawing Sheets

(51) Int. Cl.
*H01M 8/04029* (2016.01)
*H01M 8/04223* (2016.01)
*H01M 8/04014* (2016.01)
*H01M 8/0432* (2016.01)
*H01M 8/24* (2016.01)

(52) U.S. Cl.
CPC ... *H01M 8/04253* (2013.01); *H01M 8/04268* (2013.01); *H01M 8/04358* (2013.01); *H01M 8/24* (2013.01); *H01M 2250/20* (2013.01); *Y02T 90/32* (2013.01)

(56) References Cited

U.S. PATENT DOCUMENTS

| | | | |
|---|---|---|---|
| 2004/0137313 A1 | 7/2004 | Jaura et al. | |
| 2008/0026274 A1* | 1/2008 | Zhang | H01M 8/04029 429/429 |

FOREIGN PATENT DOCUMENTS

| | | |
|---|---|---|
| EP | 0074701 A1 | 3/1983 |
| JP | 10340734 A | 12/1998 |
| JP | 2001229947 A1 | 8/2001 |
| JP | 2005322596 A | 11/2005 |
| JP | 2009245802 A | 10/2009 |

OTHER PUBLICATIONS

English language translation of Chinese Office Action dated Dec. 25, 2015, in Chinese Application No. 201380016020.1.
English language translation of Japanese Office Action dated Aug. 14, 2015, in Japanese Application No. 2015-500786.
International Search Report dated May 3, 2013, in International Application No. PCT/EP2013/000499.

* cited by examiner

METHOD FOR OPERATING A FUEL CELL STACK FOR A FUEL CELL SYSTEM, AND FUEL CELL SYSTEM

BACKGROUND OF THE INVENTION

Field of the Invention

The invention relates to a method for operating a fuel cell stack for a fuel cell system, in which by reversing the flow direction of a coolant during a cooling operation, the coolant in the fuel cell stack is initially conveyed in a first direction and is subsequently conveyed in a second direction which is at least substantially opposite to the first direction. The invention further relates to a fuel cell system.

Description of the Related Art

When a fuel cell stack of a fuel cell system is put in operation at cold ambient temperatures, i.e., temperatures less than 0° C., heat generation typically occurs at isolated locations in the fuel cell stack, as the result of which the reaction of hydrogen with oxygen is initiated particularly quickly at these locations. With increasing heating of the location, increasingly more electrical energy can be delivered from this area of the fuel cell, and the location heats up further. Since the efficiency of the fuel cell rises with increasing temperature, even more electrical energy can be generated, and the location heats up even further.

These types of locally delimited locations, having a higher temperature than their surroundings in the fuel cell stack, are also referred to as "hot spots." Since excessive heating of the fuel cell stack in the area of the hot spots may dry out or damage the membrane of the fuel cell, even for a cold start or a freezing cold start of the fuel cell stack a coolant flow is set which dissipates the heat from the hot spots. Thus, even in a cold start or freezing cold start of the fuel cell stack, a cooling operation takes place which is used for dissipating the heat generated by the hot spots.

DE 10 2007 034 300 A1 describes a reversal of the flow direction of the coolant in the fuel cell stack during start-up of the fuel cell stack. A coolant pump which is able to switch over from a first conveying direction to a second conveying direction opposite to the first direction is situated in a coolant circuit which encompasses the fuel cell stack. For reversing the flow direction, a comparatively short cycle time of six seconds, for example, is selected in order to keep temperature differences within the fuel cell stack as low as possible. An even shorter cycle time may be set in order to further decrease the temperature range that is present in the fuel cell stack.

The fact that problems in the cooling operation may result despite the reversal of the flow direction of the coolant is regarded as disadvantageous.

The object of the present invention, therefore, is to provide a method of the type stated at the outset as well as a fuel cell system by means of which an improvement in the starting behavior of the fuel cell stack may be achieved.

BRIEF SUMMARY OF THE INVENTION

According to a first aspect of the invention, a time period, after the elapse of which the flow direction is reversed, is changed at least once during the cooling operation. The coolant flow in the fuel cell stack may thus be set precisely in such a way that a sufficient quantity of heat is dissipated from hot spots in order to avoid damage of the membrane of the particular fuel cell. On the other hand, the particular predefined time period is not so long that excessive cooling occurs in this area after heat has been removed from the hot spot. Otherwise, due to the fact that water has already been produced by the fuel cell reaction, this could result in ice formation, and thus, plugging of reactant channels. As the result of changing the time periods in which the coolant flows through the fuel cell stack in the particular direction during the cooling operation, these time periods may be optimally coordinated with the situation existing at the moment, so that neither insufficient dissipation of heat from the hot spots nor excessive heat dissipation occurs. Thus, an improvement in the starting behavior of the fuel cell stack, in particular for a cold start or freezing cold start, is achieved.

In particular, start-up of the fuel cell stack, i.e., reaching an operating state in which the fuel cell stack is able to provide a desired level of electrical power, is thus particularly quick and stable. In turn, during the start-up process less energy needs to be obtained from some other electrical energy store, such as a battery, which may be present in the fuel cell system. This is particularly advantageous when the fuel cell system is situated in a vehicle, since more electrical energy is available from the energy store for other vehicle functions, such as air conditioning of the interior.

During the cooling operation, i.e., during the period when heat is dissipated from the hot spots in the area of the fuel cell stack and distributed to areas surrounding the hot spots, the reversal of the flow direction takes place largely without interruptions, provided that inertial effects of the coolant flow are disregarded. In particular, a pumping device continuously conveys the coolant during the cooling operation. However, the coolant flow may come to a standstill for a certain period of time before the flow direction is reversed.

In one advantageous embodiment of the invention, the time period, after the elapse of which the flow direction is reversed, is extended with increasing duration of the cooling operation. This is based on the finding that at the start of the cooling operation, when the hot spots are still comparatively small, the heat of the hot spot needs to be discharged only a short distance away in order to ensure sufficient cooling of the hot spot due to renewed inflow of cooler coolant. In addition, an initially short time period is conducive to the heat remaining essentially predominantly in the fuel cell stack, and thus, to contributing to rapidly achieving a desired operating temperature of the overall fuel cell stack. Furthermore, as the result of initially short time periods after which the flow direction is reversed, undesirable ice formation in the area of hot spots from which heat has been withdrawn due to the coolant flow may be prevented in a particularly reliable manner. However, the heat may be distributed in the fuel cell stack particularly well by progressively increasing the time periods.

It has also been shown to be advantageous when, at least during a first time period, a coolant volume which has a higher temperature than another coolant volume which is likewise present in a coolant circuit which encompasses the fuel cell stack is not situated farther than a predetermined distance from a heat source that is present in the fuel cell stack. This prevents the heat source or the hot spot from being cooled to such an extent that reaction water which is formed in the hot spot is able to freeze. In addition, the oscillation of the heated coolant volume about the heat source, i.e., the hot spot, ensures a desired heat distribution from the hot spot in both directions, but only over the predetermined distance.

According to another aspect of the invention, in the method for operating a fuel cell stack for a fuel cell system, a distance at which a coolant volume is situated from a heat source that is present in the fuel cell stack is changed at least once during the cooling operation. In other words, the amplitude of the coolant oscillation varies during the ongoing cooling operation. An improvement in the starting behavior of the fuel cell stack may be improved in this manner as well.

The distance may in particular be changed during the ongoing cooling operation by changing the pressure and/or the output of a pumping device which conveys the coolant. Thus, different flow velocities may be set, even for fixed cycle times of the reversal of the flow direction, by changing the pressure and/or the output of the pumping device. As the result of setting different flow velocities, the coolant volume covers different distances in the fuel cell stack.

Changing the time period after the elapse of which the flow direction is reversed and/or changing the distance may be carried out in particular as a function of a temperature in the fuel cell stack and/or as a function of the external temperature. Thus, changing the coolant flow in the fuel cell stack may be adapted particularly well to the particular conditions.

It has also been shown to be advantageous when, during a first phase of the cooling operation, a coolant volume which has a higher temperature than another coolant volume which is present in a coolant circuit which encompasses the fuel cell stack is moved back and forth between a first coolant connection of the fuel cell stack and a second coolant connection of the fuel cell stack. It is thus ensured that the heated coolant volume does not leave the fuel cell stack, and the heat which is dissipated from the heat sources or hot spots is utilized particularly well for raising the temperature of the overall fuel cell stack. In addition, the heat of the increasingly extending hot spots is thus distributed particularly well over a progressively larger partial area of the fuel cell stack.

It is also advantageous when, during a second phase of the cooling operation, the coolant volume is conveyed at least up to the first coolant connection, and/or up to the second coolant connection, of the fuel cell stack. Namely, the coolant flows from different cooling channels which are provided for cooling the particular fuel cells of the fuel cell stack intermix in the region of the coolant connections. Due to this intermixture of coolant which originates from different cooling channels of the fuel cell stack, good homogenization of the heat of the coolant takes place. In particular, heat distribution thus also occurs in directions which differ from the flow direction of the coolant, such as perpendicular to the flow direction of the coolant through the fuel cell stack. This convective heat distribution, which takes place in addition to the distribution due to heat conduction which occurs anyway, results in particularly rapid heating up of the overall fuel cell stack.

In another advantageous embodiment of the invention, during the cooling operation the coolant is conveyed, at least intermittently, solely through a first coolant circuit which encompasses the fuel cell stack and which is fluidically coupleable to a second coolant circuit which includes a cooler. This first, small coolant circuit contains a lesser quantity of coolant than the overall coolant circuit, which may be implemented by fluidically coupling the first coolant circuit and the second coolant circuit. Since the coolant is initially conveyed only in the first, small coolant circuit, particularly rapid heating up of the coolant is achievable.

In another embodiment of the invention, as a function of a temperature of a coolant volume which is present in the fuel cell stack, at least a portion of this coolant volume may be replaced by coolant from a coolant circuit which encompasses the fuel cell stack and which has a lower temperature. In other words, a coolant volume which is present in the fuel cell stack is thus initially heated, and cooler coolant from areas of the coolant circuit outside the fuel cell stack is subsequently introduced into the fuel cell stack. A high performance level of the fuel cell may be achieved particularly quickly, in particular when the warmer coolant volume is only partially replaced by cooler coolant. Ultimately, the entire amount of coolant present in the coolant circuit is heated in this manner, i.e., by batchwise heating of the coolant volume which is present in the fuel cell stack.

Lastly, it has been shown to be advantageous when an outflow of coolant from the fuel cell stack and/or an inflow of coolant into the fuel cell stack is/are hindered, at least intermittently, by means of at least one flow conducting element as a function of a temperature of the coolant which is present in the fuel cell stack. The at least one flow conducting element may be a flap, for example.

The flow conducting element thus ensures that a comparatively large portion of the coolant remains in the fuel cell stack. The heat which is dissipated from the hot spots during the cooling operation is thus utilized in particular largely for heating up the overall fuel cell stack.

The at least one flow conducting element may preferably be brought into a standby position in which it no longer hinders the outflow of coolant and/or the inflow of coolant. Correspondingly, the flow conducting element fulfills its function for keeping the coolant in the fuel cell stack for only as long as this is desired for uniformly heating up the fuel cell stack.

When the coolant circuit which includes the fuel cell has reached a desired temperature, a change may be made from the alternating operating mode, i.e., which reverses the flow direction, into a different, normal operating mode in which the coolant flows through the fuel cell stack in only one flow direction.

The fuel cell system according to the invention, which in particular may be provided for a vehicle, includes a coolant circuit in which a fuel cell stack is situated. In addition, means are provided for reversing the flow direction of a coolant which is present in the fuel cell stack. The means for reversing the flow direction may also be situated outside the fuel cell stack. The means may be a pump, for example, which is designed for conveying the coolant in both directions (i.e., forwards and backwards). A control device which is used for controlling the means is designed for changing a time period, after the elapse of which the flow direction is reversed, during the cooling operation. Additionally or alternatively, the control device may be designed for changing a distance at which a coolant volume is situated from a heat source that is present in the fuel cell stack. This may be achieved in particular by the control device controlling a pumping device. An improvement in the starting behavior of the fuel cell stack may be achieved by means of such a fuel cell system, since the heat which is dissipated from hot spots during the cooling operation may be kept particularly well in the region of the fuel cell stack. This results in heating up of the fuel cell stack, so that it may quickly provide the desired power.

In one possible technical approach, the means for reversing the flow direction preferably include a valve device by means of which in a first switching position, flow through the fuel cell stack is achievable in a first direction, and in a second switching position, flow through the fuel cell stack in a second direction is achievable which is at least substantially opposite to the first direction. By providing such a valve device, a complicated, but likewise conceivable in principle, pumping device which may convey the coolant in the first direction and also in the second direction may be dispensed with.

The change in the time period and/or the distance may be set in particular as a function of the temperature of the coolant, which may be detected by means of suitable temperature sensors in particular at a coolant inlet and/or at a coolant outlet of the fuel cell stack.

For fuel cell stacks in which the measurement of the coolant temperature does not take place in the electrochemically active region of the single cells of the stack, a time delay until the heat which is generated by the fuel cell stack arrives at the temperature sensors may result. In this case, there is an alternative option for controlling the change in the time period and/or the distance, by determining the efficiency of the fuel cell stack via electrical conduction (i.e., voltage and/or current) of the fuel cell stack. This option is particularly advantageous, since the electrical conduction of the fuel cell stack must be measured anyway. This means that at low temperatures, the voltage is lower (due to lower efficiency) than at higher temperatures. The larger the areas in which the temperature is higher, the higher the efficiency of the fuel cell stack with which the coolant must be transported for farther distances or longer times in order to convey the heat away from the warm areas.

The advantages and preferred embodiments of a particular aspect of the invention are also considered advantages of the preferred embodiments of another particular aspect of the investigation, and vice versa. In addition, the advantages and preferred embodiments for the method according to the invention also apply to the fuel cell system according to the invention.

The features and feature combinations mentioned above in the description as well as the features and feature combinations mentioned below in the description of the figures and/or only shown in the figures may be used not only in the particular stated combination, but also in other combinations or alone without departing from the scope of the invention.

BRIEF DESCRIPTION OF THE SEVERAL VIEWS OF THE DRAWINGS

Further advantages, features, and particulars result from the claims, the following description of preferred embodiments, and with reference to the drawings, which show the following:

DETAILED DESCRIPTION OF THE INVENTION

Figure 1:
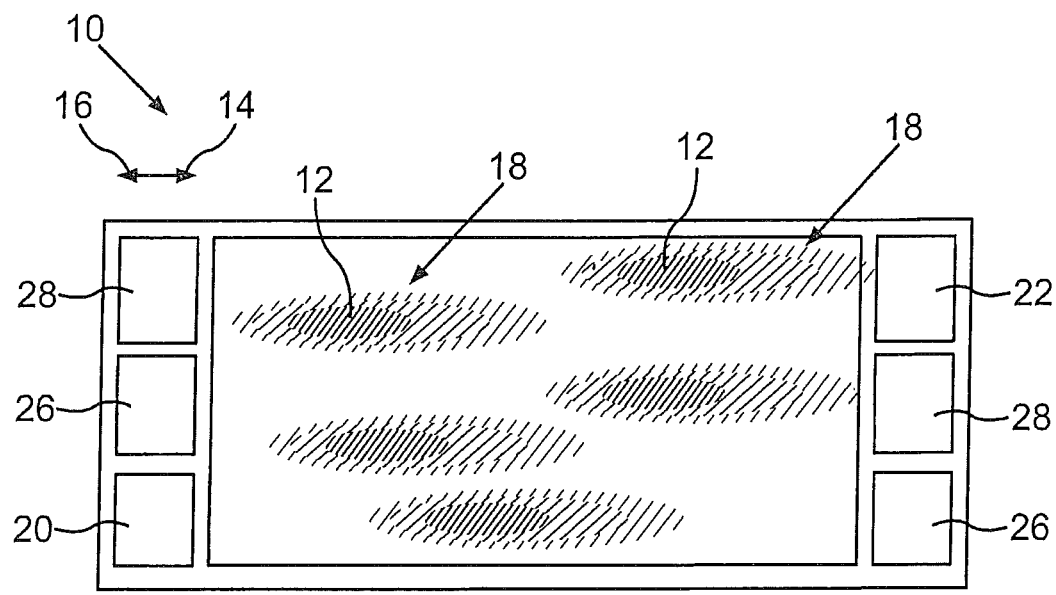
FIG. 1 schematically shows a fuel cell stack of a fuel cell system for a vehicle, in which heat which is formed in the region of hot spots is distributed by reversing the flow direction of a coolant.

FIG. 1 schematically shows a fuel cell stack 10 of a fuel cell system for a vehicle, which has been put in operation at a very low ambient temperature, i.e., at an ambient temperature less than 0° C. Such a start-up of the fuel cell stack 10 is also referred to as a cold start or a freezing cold start. In the area of single fuel cells of the fuel cell stack 10, so-called hot spots 12 initially form, at which location the start-up of the fuel cell reaction is better than in adjacent areas, and which therefore heat up more intensely than the surroundings. Coolant which flows back and forth in the fuel cell stack 10 during the cooling operation ensures that, despite formation of the hot spots 12, no undesirably intense heating of the membrane of a particular fuel cell, which in particular may be designed as a polymer-electrolyte membrane (PEM), takes place.

Thus, in the present case, during the cooling operation the coolant does not flow through the fuel cell stack 10 just in one direction, but, rather, is initially conveyed in a first direction 14 and then in a second direction 16, the directions 14, 16 being illustrated by a double arrow in FIG. 1. The reversal of the flow direction of the coolant takes place quickly enough that the heat which is dissipated from the particular hot spot 12 does not leave the fuel cell stack 10. The heat may thus be distributed particularly well in the area of the particular hot spots 12.

Due to the back-and-forth flow or oscillation of the coolant, flattening of the temperature profile present in the particular hot spot 12 is achieved, so that a particularly large region 18 of the fuel cell stack 10 around the particular hot spot 12 is heated. However, the coolant still prevents a maximum temperature, which could result in damage to the membrane, from being exceeded in this region 18.

The fuel cell stack 10 has a first coolant connection or coolant inlet 20 and a second coolant connection or coolant outlet 22. During normal operation of a coolant circuit 24 which encompasses the fuel cell stack 10 (see FIG. 3), the coolant flows from the coolant inlet 20 to the coolant outlet 22, since no reversal of the flow direction takes place. However, during the freezing cold start or cold start of the fuel cell stack 10, coolant penetrates into the fuel cell stack 10 either through the coolant inlet 20 or through the coolant outlet 22, depending on the direction 14, 16 which has just been set. Further connections 26, 28 of the fuel cell stack 10 are used to supply or discharge the operating materials which take part in the fuel cell reaction, such as (customarily recirculated) hydrogen, and air or oxygen. Since these operating materials also flow through the fuel cell stack 10, but their flow direction is not reversed, the regions 18 formed around the hot spots 12, in which coolant is present that is heated above the temperature of the surroundings of these regions 18, are extended slightly more toward the coolant outlet 22.

Due to the repeated reversal of the flow direction of the coolant, the hot spots 12 remain, but the regions 18 that are heated by the hot spots 12 increasingly grow. In addition, the repeated reversal of the flow direction prevents the formation of ice due to freezing of reaction water which is formed at the particular hot spot 12.

In the present case, the reversal of the flow direction of the coolant initially takes place comparatively quickly, i.e., after a relatively short time period elapses. In other words, the amplitude of the coolant oscillation is initially particularly small, and a coolant volume which dissipates heat from a hot spot 12 as a heat source covers only a comparatively short distance in the particular direction 14, 16. In particular, although this measure allows the hot spot 12 to grow, at the same time it prevents ice formation due to the fact that the heated coolant is not very far away from the particular hot spot 12.

However, with increasing enlargement of the regions 18, the amplitude of the coolant oscillation increases; i.e., the coolant volume which is heated at the particular hot spot 12 covers a greater distance. For a coolant pump having a constant pumping capacity, this may be achieved by increasing the time period after the elapse of which the flow direction is reversed. Alternatively, during time periods which remain constant, the coolant may be conveyed with an increasingly higher velocity, so that it covers a greater distance in the same time period.

In this progressive increase in the amplitude of the coolant oscillation, it should initially be ensured that the heated coolant remains in the area between the coolant inlet 20 and the coolant outlet 22, so that heat is dissipated from the hot spots 12, but not from the fuel cell stack 10.

However, as the distance over which the heated coolant moves in the particular direction 14, 16 increases, the heated coolant arrives at the coolant outlet 22 and the coolant inlet 20. Coolant which originates from separate cooling channels of the fuel cell stack 10, usually at different respective temperatures, intermixes in the area of the coolant outlet and coolant inlet. Thus, equilibration of the temperatures of the coolant which is present in the particular cooling channels takes place.

While heat distribution in the first direction 14 and the second direction 16 initially takes place due to the alternation of the flow direction, the intermixture of the coolant in the area of the coolant inlet 20 and the coolant outlet 22 also results in particularly good distribution of the heat in a direction perpendicular to these directions 14, 16. Thus, the entire volume of the coolant present in the fuel cell stack 10 heats up particularly quickly.

Figure 2:
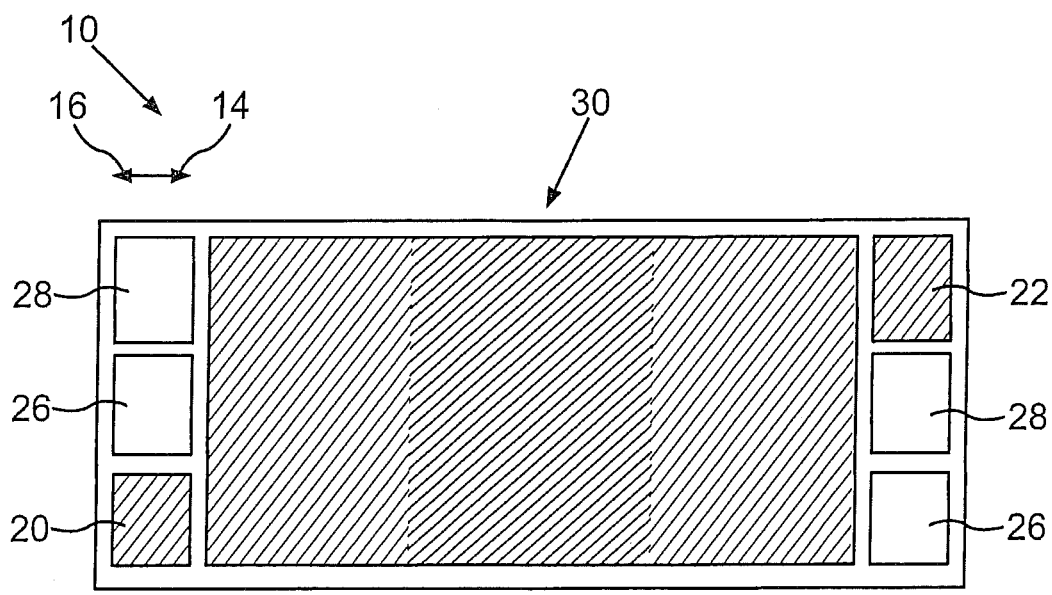
FIG. 2 shows the fuel cell stack according to FIG. 1, in which the coolant has an increased temperature in the overall fuel cell stack due to distributing the heat.

This situation is illustrated in FIG. 2, in which the heated coolant has penetrated into the areas of the coolant inlet 20 and the coolant outlet 22. A relative temperature maximum is thus present in the central area 30 of the fuel cell stack 10 due to the continuing alternating coolant flow, which results in introduction of colder coolant from outside the fuel cell stack 10 into the fuel cell stack 10. When this state of heating up the entire coolant volume present in the coolant circuit 24 has been achieved (see FIG. 3), whereby in particular for the cold start or freezing cold start a smaller coolant circuit (not illustrated) with less coolant volume may be provided, a switchover may be made to the normal cooling operation, in which the coolant flows through the coolant inlet 20 into the fuel cell stack 10 and exits same through the coolant outlet 22, without the flow direction of the coolant being (again) reversed in alternation, or subsequently.

Figure 3:
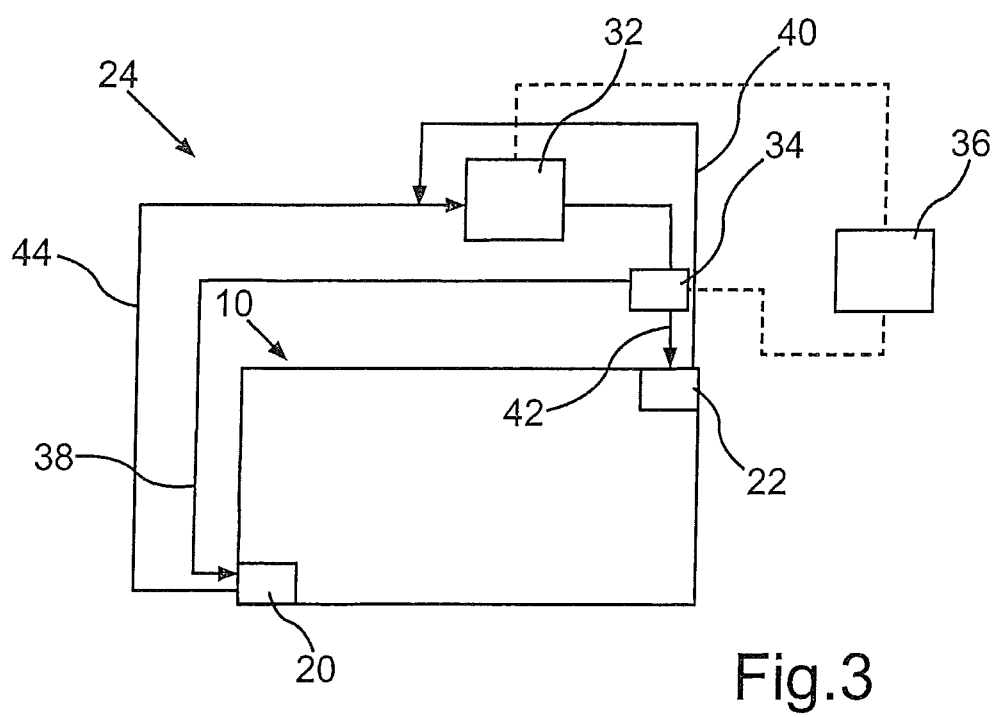
FIG. 3 schematically shows the incorporation of the fuel cell stack into a coolant circuit.

As is apparent from FIG. 3, the fuel cell stack 10 is incorporated into the coolant circuit 24, in which a coolant pump 32 conveys the coolant. A switchover may be made to normal operation when, due to the particularly large amplitude of the coolant flow which is alternating in the particular direction 14, 16, the entire quantity of coolant present in the coolant circuit 24 is uniformly heated up. The coolant circuit 24 may then be fluidically coupled to an additional coolant circuit (not shown) in which a cooler is situated. This may take place by opening valves which close off the additional coolant circuit from the coolant circuit 24 during the cold start or freezing cold start.

However, it is also possible, after heating only the coolant volume which is present in the area of the fuel cell stack 10 slightly longer, to convey the coolant only in one of the two directions 14, 16, so that a portion of the heated coolant present in the fuel cell stack 10 is replaced by cooler coolant which originates from the remaining area of the coolant circuit 24. Instead of a partial replacement of the coolant, complete replacement by cold coolant may also take place. In that case, a complete charge of the heated coolant is withdrawn from the fuel- cell stack 10 and replaced by cold, not yet heated coolant from the coolant circuit 24. After such a partial or complete replacement of the coolant present in the fuel cell stack 10 has been repeated often enough, the entire quantity of coolant present in the coolant circuit 24 is more or less uniformly heated up. A switchover may then be made to normal operation, in which the flow direction of the coolant is no longer reversed.

Alternatively or additionally, flaps or flow conducting elements which provide resistance to the flow may be provided at the coolant inlet 20 and/or at the coolant outlet 22 which hinder inflow of coolant into the fuel cell stack 10 or outflow of coolant from the fuel cell stack 10. This type of flap or flow conducting element may be designed, for example, as a bimetal element which changes position as a function of temperature. When a desired temperature is reached, the flap is brought into a position, in particular automatically, in which it no longer hinders inflow of the coolant into the fuel cell stack 10 or outflow of the coolant from the fuel cell stack 10. However, while the flap is in its functional position, it ensures that the coolant at least substantially remains in the fuel cell stack 10. As soon as the flap is folded back, a switchover may be made to normal operation.

The incorporation of the fuel cell stack 10 into the coolant circuit 24 is apparent in FIG. 3. The coolant flows from the coolant pump 32 to a valve 34 which is controlled by a control device 36. In a first switching position of the valve 34, the coolant flows through a line 38 to the coolant inlet 20 of the fuel cell stack 10. Correspondingly, coolant discharged from the fuel cell stack 10 exits same through the coolant outlet 22. From there, the coolant arrives at the low-pressure side of the coolant pump 32 via a line 40.

In a second switching position of the valve 34, the coolant flows from the valve 34 to the coolant outlet 22 of the fuel cell stack 10 via a third line 42, and exits the fuel cell stack via a fourth line 44 which is connected to the coolant inlet 20 and which likewise leads to the low-pressure side of the coolant pump 32. Thus, by changing the switching positions of the valve 34, it is possible, even with a coolant pump 32 which conveys the coolant in only one direction, to achieve flow through the fuel cell stack 10 in the first direction 14 or in the second direction 16 (see FIG. 1).

As indicated in FIG. 3, the coolant pump 32 may also be controlled by means of the control device 36. The coolant pump 32 may act on the coolant with different pressure levels, or may set different outputs. The coolant may thus be conveyed at different velocities, so that, even for a constant cycle time of the switching of the valve 34 into the different switching positions, different amplitudes of the coolant flow may be set. For a coolant pump 32 which is able to convey in both directions 14, 16, the valve 34 may be dispensed with, and the reversal of the flow direction may be achieved by controlling the coolant pump 32 by means of the control device 36.

The coolant circuit 24 schematically shown in FIG. 3 is incorporated into an additional coolant circuit (not shown) which includes a cooler. In the cooling mode, in which heat is dissipated from the hot spots 12 and distributed in the fuel cell stack 10, the coolant initially preferably remains in the coolant circuit 24. The coolant circuit 24 may subsequently be coupled to the second coolant circuit which includes the cooler, so that it may then discharge excess heat, which is released from the fuel cell stack 10 during operation, via the cooler.

In the operating mode of the fuel cell stack 10, in which the fuel cell stack is incorporated into the larger coolant circuit which includes the cooler, the switching position of the valve 34 no longer has to be changed; instead, the coolant flows into the fuel cell stack 10 via the coolant inlet 20, and exits the fuel cell stack via the coolant outlet 22.

LIST OF REFERENCE NUMERALS

10 Fuel cell stack
12 Hot spot
14 Direction
16 Direction
18 Region
20 Coolant inlet
22 Coolant inlet [sic; outlet]
24 Coolant circuit
26 Connection
28 Connection
30 Central area
32 Coolant pump
34 Valve
36 Control device
38 Line
40 Line
42 Line
44 Line

The invention claimed is:

1. A method for preventing the formation of locally delimited locations having a higher temperature than their surroundings (hot spots) in a fuel cell stack (10) when initially operating the fuel cell stack (10) for a fuel cell system, comprising:
prior to operating a fuel cell system, determining whether the operating temperature is one at which there is a likelihood of formation of hot spots in the fuel cell stack (10) during initial operation,
in the case of determining that there is a likelihood of formation of hot spots, initially conveying a coolant in a first direction (14) during a cooling operation,
reversing the flow direction (14, 16) of the coolant during the cooling operation, whereby the coolant in the fuel cell stack (10) is initially conveyed in a first direction (14) and is subsequently conveyed in a second direction (16) which is at least substantially opposite to the first direction (14), for a period of time such that a sufficient quantity of heat is dissipated from hot spots in order to avoid damage of the membrane of the fuel cell, but without allowing excessive cooling to occur in any hot spot area after heat has been removed introducing a possibility that water already produced by the fuel cell reaction at this spot could result in ice formation,
wherein a time period, after the elapse of which the flow direction (14, 16) is reversed, is changed during the cooling operation.

2. The method according to claim 1, wherein the time period is extended with increasing duration of the cooling operation.

3. The method according to claim 1, wherein at least during a first time period, a coolant volume which has a higher temperature than another coolant volume in a coolant circuit (24) which encompasses the fuel cell stack (10) is not situated farther than a predetermined distance from a hot spot (12) that is present in the fuel cell stack (10).

4. The method according to claim 1, wherein during a first phase of the cooling operation, a coolant volume which has a higher temperature than another coolant volume which is present in a coolant circuit (24) which encompasses the fuel cell stack (10) is moved back and forth between a first coolant connection (20) of the fuel cell stack (10) and a second coolant connection (22) of the fuel cell stack (10).

5. The method according to claim 4, wherein during a second phase of the cooling operation, the coolant volume is conveyed at least up to the first coolant connection (20) and/or up to the second coolant connection (22) of the fuel cell stack (10).

6. The method according to claim 1, wherein during the cooling operation the coolant is conveyed, at least intermittently, solely through a first coolant circuit (24) which encompasses the fuel cell stack (10) and which is fluidically coupleable to a second coolant circuit which includes a cooler.

7. The method according to claim 1, wherein as a function of a temperature of a coolant volume which is present in the fuel cell stack, at least a portion of this coolant volume is replaced by coolant from a coolant circuit (24) which encompasses the fuel cell stack (10) and which has a lower temperature.

8. The method according to claim 1, wherein as a function of the efficiency of the fuel cell stack, which is determined using the electrical conductivity of the fuel cell stack, at least a portion of this coolant volume is replaced by coolant from a coolant circuit (24) which encompasses the fuel cell stack (10) and which has a lower temperature.

9. The method according to claim 1, wherein an outflow of coolant from the fuel cell stack (10) and/or an inflow of coolant into the fuel cell stack (10) is/are hindered, at least intermittently, by means of at least one flow conducting element as a function of a temperature of the coolant which is present in the fuel cell stack (10).

10. A fuel cell system including
a coolant circuit (24) which encompasses a fuel cell stack (10),
means (32, 34) for reversing the flow direction (14, 16) of a coolant which is present in the fuel cell stack (10), and
a control device (36) programmed for controlling the means (32, 34) to prevent the formation of locally delimited locations having a higher temperature than their surroundings (hot spots) in a fuel cell stack (10) when initially operating the fuel cell stack (10) for the fuel cell system, the control device (36) programmed to determine, at initiation of operation of a fuel cell system, whether the operating temperature is one at which there is a likelihood of formation of hot spots in the fuel cell stack (10) during initial operation, the control device (36) programmed, in the case of determining that there is a likelihood of formation of hot spots, for changing, during the cooling operation
a time period after the elapse of which the flow direction (14, 16) is reversed, for a period of time such that a sufficient quantity of heat is dissipated from hot spots in order to avoid damage of the membrane of the fuel cell, but without allowing excessive cooling to occur in any hot spot area after heat has been removed introducing a possibility that water already produced by the fuel cell reaction at this spot could result in ice formation, and/or
a distance at which a coolant volume is situated from a hot spot (12) that is present in the fuel cell stack (10).

11. The fuel cell system according to claim 10, wherein the means for reversing the flow direction (14, 16) include a valve device (34) by means of which in a first switching position, flow through the fuel cell stack (10) is achievable in a first direction (14), and in a second switching position, flow through the fuel cell stack (10) is achievable in a second direction (16) which is at least substantially opposite to the first direction (14).

12. The method according to claim 1, wherein the fuel cell system is a vehicle fuel cell system.

13. The method according to claim 1, wherein the operating temperature is 0° C. or below.

\* \* \* \* \*